US008650396B2

(12) United States Patent
Manoharan et al.

(10) Patent No.: US 8,650,396 B2
(45) Date of Patent: Feb. 11, 2014

(54) PERMISSION-BASED DYNAMICALLY TUNABLE OPERATING SYSTEM KERNEL

(75) Inventors: Santosh Kumar Gangaraj Manoharan, Karnataka (IN); Aravind Nanjundaswamy, Karnataka (IN); Sunil Agrawal, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 613 days.

(21) Appl. No.: 12/628,673

(22) Filed: Dec. 1, 2009

(65) Prior Publication Data
US 2010/0318793 A1 Dec. 16, 2010

(30) Foreign Application Priority Data
Jun. 11, 2009 (IN) .......................... 1382/CHE/2009

(51) Int. Cl.
*H04L 29/06* (2006.01)
(52) U.S. Cl.
USPC ........... 713/166; 370/241; 713/164; 713/165; 713/2; 709/220; 709/222; 707/E17.005
(58) Field of Classification Search
USPC .............................. 713/164–166, 2; 370/241; 707/E17.005; 709/220, 222
See application file for complete search history.

(56) References Cited

U.S. PATENT DOCUMENTS

| 7,143,281 | B2 * | 11/2006 | Chandramouleeswaran et al. .............................. 713/100 |
| 7,191,322 | B2 | 3/2007 | Millward et al. |
| 2009/0129277 | A1 * | 5/2009 | Supalov et al. ............... 370/241 |
| 2009/0328058 | A1 * | 12/2009 | Papaefstathiou et al. ...... 718/107 |
| 2010/0023522 | A1 * | 1/2010 | Madathilparambil George et al. ................................ 707/9 |

OTHER PUBLICATIONS

Ali Butt; et al;The performance impact of kernel prefetching on buffer cache replacement algorithms; Jun. 2005;SIGMETRICS '05: Proceedings of the 2005 ACM SIGMETRICS international conference on Measurement and modeling of computer systems.*
Pettis, N; et. al.; A Homogeneous Architecture for Power Policy Integration in Operating Systems; Computers, IEEE Transactions on vol. 58, Issue: 7.*

* cited by examiner

*Primary Examiner* — Justin T Darrow
*Assistant Examiner* — Angela Holmes

(57) ABSTRACT

A server includes a central processing unit and electronic memory communicatively coupled to the central processing unit. The memory stores a dynamically tunable operating system kernel that includes at least one tunable implemented as a plurality of states. Each application managed by the operating system is assigned to one of these states according to a permission level association with the application. Each state defines a range of automated tuning of the tunable that is authorized to applications assigned to the state.

20 Claims, 5 Drawing Sheets

PERMISSION-BASED DYNAMICALLY TUNABLE OPERATING SYSTEM KERNEL

RELATED APPLICATIONS

Pursuant to 35 U.S.C. 119(b) and C.F.R. 1.55(a), the present application corresponds to and claims the priority of Indian Patent Application No. 1382/CHE/2009, filed on Jun. 11, 2009, the disclosure of which is incorporated herein by reference in its entirety.

BACKGROUND

Operating systems for computing devices are typically built around a central software component known as a kernel. An operating system's kernel is its core, as the kernel often provides the lowest level of abstraction in the software functionality of the operating system. Thus, the kernel usually interacts with and manages the performance of the hardware resources that an operating system is configured to control. For example, an operating system kernel generally manages the functionality of the central processing unit, system memory, and peripheral devices of the computing system on which the operating system has been deployed.

Most operating system kernels are made up of many subcomponents. For some operating systems, these subcomponents are characterized as kernel modules and kernel tunables. Kernel modules are sections of kernel code dedicated to specific purposes, such as memory management, class drivers, or interface drivers. Tunables (also known as "tunable parameters" or "tunable variables") are configurable settings in a kernel that can be adjusted according to the specific needs of a particular environment to which the operating system is deployed. For example, kernel tunables may be used to configure aspects of the kernel such as, but not limited to, the number of processes that may be simultaneously active or the amount of memory that may be allocated for certain data structures within the kernel. Some kernel tunables have their values set or changed only when an operating system is booted. Other kernel tunables may be dynamically configured ("tuned") while the kernel is running on its host device.

Dynamically configured kernel tunables can be set by either an administrator or by the kernel itself in response to changing system usage (absent and administrative decision to override automatic tuning). Current systems of automatic tunable configuration do not distinguish between different processes that cause changes in system resource tunables. For example, a user process may (with or without malicious intent) cause an inline increase of system wide resource limits, thereby leading to increased resource consumption and/or an abnormal allocation of resources that detrimentally affects other processes. As such, this allowance of any process to affect the tuning of the system may compromise system integrity in a bid to be flexible.

Most operating systems are published with a number of kernel tunables. Some of these tunables may be changed without rebooting the operating system. Accordingly, these tunables are dynamically configurable, and may be adjusted while the operating system is running on a particular host device. Typically, default values for the tunables in an operating system are chosen based on the best knowledge of a development engineer and are set at the time of an initial publishing or "cold" install of the operating system. During deployment of a server operating system to a particular host server, these tunables are often further configured by development staff to optimize the kernel for a specific environment. The process to optimize an operating system kernel to a specific workload can cost customers time and resources, and reconfiguration cycles may interrupt normal operations for those who rely on the server.

Often an optimal configuration utilizes skilled administrators, specialized tuning knowledge, and multiple validation cycles to optimally tune an operating system. In certain cases, customers have limited resources and do not wish to invest in a costly customized configuration of this nature. Moreover, the possibility exists that the operating system will become misconfigured and need retuning. One issue associated with retuning an operating system kernel is application downtime.

Current systems of automatic tunable configuration exist in which a user may set upper bounds on resources as tunable values, and when the system detects that the resource limits are being reached, it automatically takes action to increase one or more upper bounds, thereby overriding user settings. This override is done in a bid to improve system availability and reducing user application downtime due to retuning. These approaches also make the system adaptive to the type of load being executed. Additionally, some systems implement the converse—if resource limit tunables were automatically increased, the system may attempt to decrease the resource limit tunables when appropriate.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
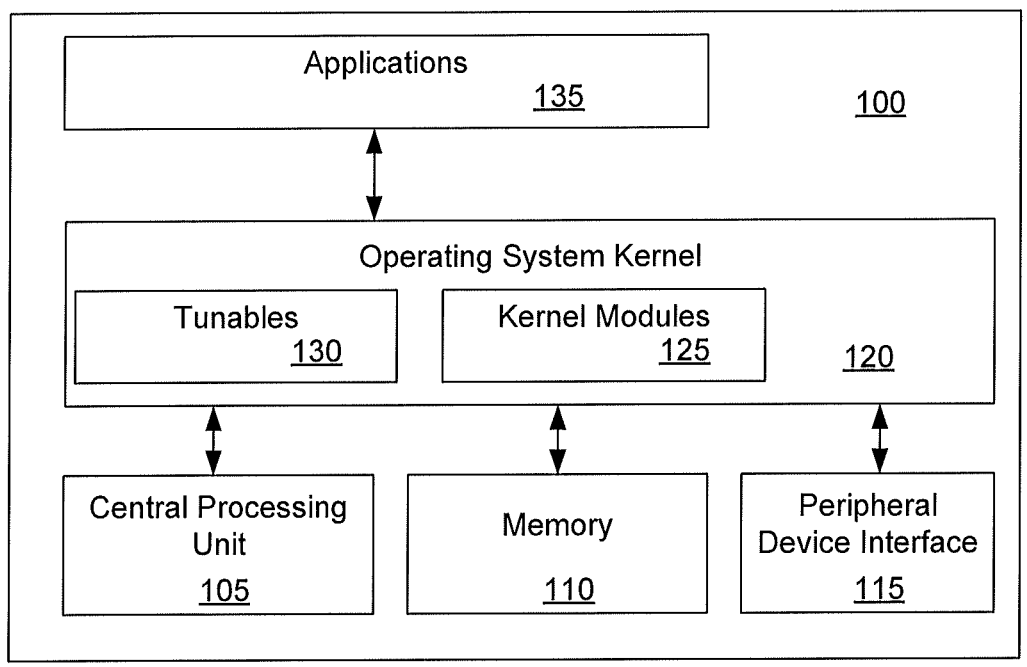
FIG. 1 is a block diagram of an illustrative computing device according to one exemplary embodiment of the principles described herein.

The present specification discloses systems, methods, and computer program products of automatic operating system kernel tuning. Specifically, the systems, methods, and computer program products of the present specification are directed to a dynamically tunable operating system kernel having at least one tunable implemented as a plurality of states. Each application managed by the operating system is assigned to one of the states according to a permission level associated with the application, and each state defines a range of automated tuning of the tunable that is authorized to applications assigned to that particular state. By allowing the automatic tuning of kernel tunables in response to an exhibited demand by only applications having an adequate level of assigned permission, untrusted processes are advantageously prevented from making undesirable allocations of system resources through automatic kernel tuning, whether these allocations are sought maliciously or nonmaliciously.

As used in the present specification and in the appended claims, the term "operating system" refers to a computer program that manages hardware resources and provides a platform from which applications may be executed.

As used in the present specification and in the appended claims, the term "kernel" refers to executable code that is stored in the main memory of a host computing device and provides the core functionality of an operating system.

As used in the present specification and in the appended claims, the term "tunable" or "tunable parameter" refers broadly to an adjustable setting in an operating system kernel.

The principles set forth in the present specification may be implemented by a hardware-based electronic processor executing executable code. Additionally or alternatively, the principles of the present specification may be implemented as a computer program product embodied as executable code stored on a computer-readable medium. The executable code stored on the computer-readable medium may cause a computer to perform the desired functionality of automatically configuring tunables in an operating system kernel. In certain embodiments, the executable code may be a component of the operating system. Examples of suitable computer-readable media for this purpose include, but are not limited to, volatile and nonvolatile solid-state memory (e.g., RAM, ROM, FLASH, EEPROM, etc.), optical media, and magnetic media.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative computer systems and methods.

Referring now to FIG. 1, a block diagram of an illustrative server (100) is shown. The server (100) includes a central processing unit (105), at least one memory (110), and an interface (115) to peripheral devices. The central processing unit may include multiple processing cores consistent with principles well-known in the art. The memory (110) is communicatively coupled to the central processing unit (105) and may include high-speed, volatile memory, such as random access memory (RAM) that stores executable code run by the central processing unit (105) and data corresponding to the executable code.

The central processing unit (105) may communicate with peripheral devices through the peripheral device interface (115). Peripheral devices may transmit data to the central processing unit (105) and receive data from the central processing unit (105). The peripheral device interface (115) may include any hardware necessary to communicatively couple peripheral devices to the central processing unit (105), including jacks, electrical conductors, microcontrollers, sensors, transmitters, and the like. The peripheral devices may include devices that allow a human user to communicate with the central processing unit (105), such as one or more keyboards, visual monitors, cursor manipulation devices, printers, speakers, and the like. Additionally, the peripheral devices may include networking equipment, such as routers and/or switches that allow the central processing unit (105) to communicate with other computing devices over a network. Specifically, where the present example illustrates a server (100), the peripheral device interface (115) may allow the server (100) to receive requests from networked devices and respond to the requests.

An operating system kernel (120) is initialized in the memory (110) of the server (100) and executed by the central processing unit (105). The operating system kernel (120) is configured to manage the operations of the central processing unit (105), its memory (110), and the peripheral device interface (115). Additionally, the operating system kernel (120) may provide access to system resources by serving as the gateway through which higher-level applications/processes may gain access to the central processing unit (105), the memory (110), and the peripheral device interface (115).

The operating system kernel (120) may include kernel modules (125) and tunables (130). The kernel modules (125) may be sections of kernel code dedicated to specific purposes, such as, but not limited to, memory management, class drivers, or interface drivers. Many kernel modules (125) may be configured into the kernel (120) when it is built and remain present in the kernel (120) whenever the kernel (120) is running on the central processing unit (105). Other modules (125) may be added to or removed from the kernel (120) as they are needed.

The kernel tunables (130) are settings that determine characteristics of the kernel (120) such as, for example, how many processes may be simultaneously active or how much memory may be allocated for certain data structures within the kernel (120). Some kernel tunables do not apply to the entire system, but rather to some construct with a finer granularity. For example, a driver may define a tunable that has a different value for each instance of that driver. Such tunables are defined by a "base" tunable," whose characteristics (e.g., "min," "max") are inherited by each of the instances.

Software applications (135) may be executed by the central processing unit (105) under the management of the operating system kernel (120). These software applications (135) may vary widely in size and function according to particular applications of the principles described herein. For example, the applications (135) run by the server (100) may perform server functions such as website hosting, email hosting, and/or database management.

Additionally or alternatively, the software applications (135) may include virtual machine hosting in which the sever (100) implements a plurality of virtual servers using common central processing unit (105), memory (110), and peripheral device interface (115) resources and a single instance of the operating system kernel (120). For the purposes of the present specification, virtual machine implementations and the applications run by the virtual machines will be treated simply as applications (135) managed by the operating system kernel (120).

As described above, certain of the kernel tunables (130) may be automatically configurable while the operating system kernel (120) is running on the central processing unit (105) of the server. This automatic configuration may be in response to real or anticipated demand for system resources from the applications (135) running on the server (100). However, different levels of permissions may be assigned to different applications (135) running on the server (100). Consequently, the server will respond differently to changing demands from system resources according to the application (135) expressing the changing demand. To accomplish this functionality, each single kernel tunable (130) may be implemented in a plurality of states that have varying levels of access. The different states of the tunables may correspond to different levels of permission granted to different applications (135).

Figure 2:
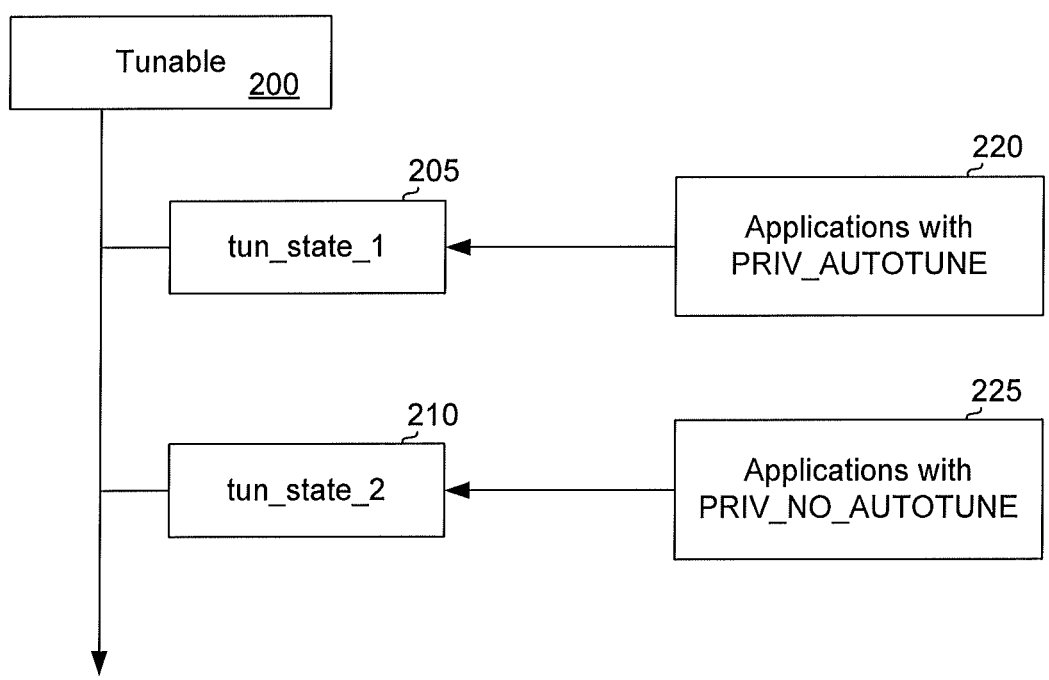
FIG. 2 is a block diagram of an illustrative tunable having a plurality of states according to one exemplary embodiment of the principles described herein.

Referring now to FIG. 2, a diagram is shown of an illustrative kernel tunable (200). Consistent with the principles described above, the core tunable (200) is implemented as two different states (205, 210). While both tunable states (205, 210) address the same configurable parameter of the base tunable (200), automatic tuning behavior differs between the two states (205, 210).

A first tunable state (205) may correspond to only applications (220) that having permission to invoke automatic tuning ("PRIV_AUTOTUNE") while a second tunable state may correspond to applications that have no permission to invoke automatic tuning ("PRIV_NO_AUTOTUNE"). Thus, the kernel tunable (200) will be considered by the operating system kernel (120, FIG. 1) in its first state (205) when an application having adequate permissions exhibits a demand for a change in the value of the tunable (200). Consequently, assuming the exhibited demand for a change to the value of the tunable (200) is within the accepted constraints of the tunable (200), the first tunable state (205) will allow the value of the tunable (200) to be altered according to the exhibited demand.

Likewise, the kernel tunable (200) will be considered by the operating system kernel (120, FIG. 1) in its second state (210) when an application (225) lacking sufficient permissions exhibits a demand for a change in the value of the tunable (200). Because the second state (210) does not allow automatic tuning of the tunable (200), no changes will be made to the value of the tunable (200) when the second state (210) of the tunable (200) is considered by the operating system kernel (120, FIG. 1).

While the tunable (200) of the present example is shown with only one modifiable parameter for clarity, It should be understood that the present specification encompasses embodiments where a kernel tunable includes multiple modifiable parameters. As such, different implementation states of such a kernel tunable may permit a range of automated tuning in one such modifiable parameter while preventing automated tuning in another such modifiable parameter. Moreover, an implementation state of the kernel tunable may permit automated tuning of one such parameter within a different range than is permitted to another such parameter within the kernel tunable or to an analogous parameter in a separate implementation state of the kernel tunable. As such, the present specification expressly notes that a kernel tunable and its implementation states may include any number of modifiable parameters that may best suit a particular application of these principles. Furthermore, any implementation state of a kernel tunable may allow or prevent automated tuning of any of these modifiable parameters within any range that may best suit a particular application of these principles, and without any necessary correlation to the permissions or properties of other modifiable parameters within the implementation state or any other implementation state.

By allowing the automatic tuning of kernel tunables (200) in response to an exhibited demand by only applications having an adequate level of assigned permission, untrusted processes are advantageously prevented from making undesirable allocations of system resources through automatic kernel tuning, whether these allocations are sought maliciously or nonmaliciously.

These methods of automatic kernel tuning are especially effective when each application has a corresponding set of permissions or permission level. A set of permissions or permission level may be assigned to an application in a number of ways, including, but not limited to the use of predetermined criteria, one or more algorithms, manual assignments, predefined permissions embedded with the application, and/or any other suitable method of assigning permissions according to a particular embodiment of the principles described herein. Permission sets may be shared among multiple tunables and/or be specific to individual tunables. Furthermore, in certain embodiments a default permission level or set of permissions may be assigned to applications having no assigned permissions. Default permissions may be substantially strict in the interest of preserving system autonomy.

Figure 3:
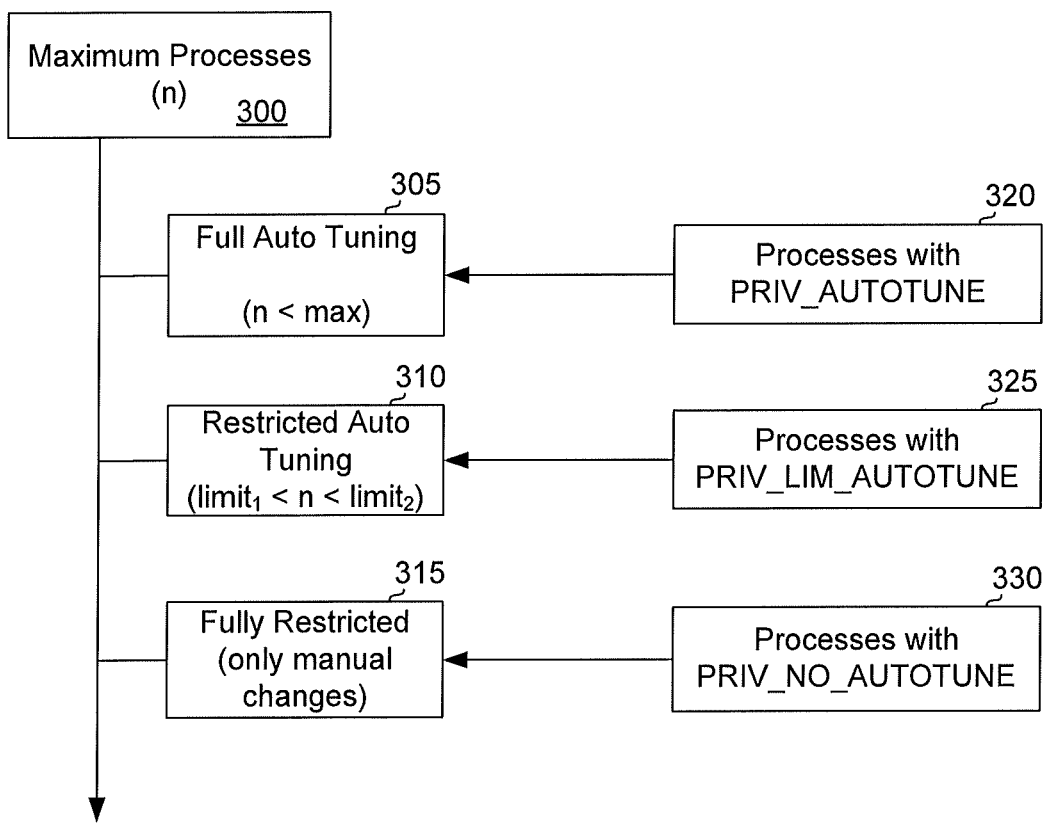
FIG. 3 is a block diagram of an illustrative tunable having a plurality of states according to one exemplary embodiment of the principles described herein.

Referring now to FIG. 3, a diagram of an illustrative kernel tunable (300) is shown. The kernel tunable (300) of the present example is a "maximum processes" parameter that defines an upper limit n for the number of applications that will be permitted to run by the operating system kernel (120, FIG. 1). Consistent with the principles described in relation to FIG. 2, the maximum processes tunable (300) is implemented in multiple states (305, 310, 315). Unlike the two-state tunable (200, FIG. 2) described in relation to FIG. 2, the present tunable (300) is implemented in three separate states (305, 310, 315).

The first state (305) is invoked for applications (320) having full auto tuning privileges (PRIV_AUTOTUNE). Accordingly, when the first state (305) is invoked, the kernel (120, FIG. 1) may respond to a need from an application (320) for a change in n by automatically increasing n up to a maximum upper bound ("max") or decreasing n where needed.

Applications (325) having limited automatic tuning permissions (PRIV_LIM_AUTOTUNE) for the tunable (300) may interact with the second state (310) of the tunable (300), which allows n to be automatically adjusted between a lower limit ($limit_1$) and an upper limit ($limit_2$).

Finally, applications (330) having no permissions with respect to the tunable (300) may interact with the third state (315) of the tunable which only allows changes to be made to n manually by an administrator. Hence, when an application (330) having no permissions experiences a demand for an increase in n, n will not be updated in the tunable (300) automatically. In certain embodiments, applications (330) that are not authorized to invoke automatic tunable tuning may trigger a notification to an administrator when a need for a change in the tunable (300) is experienced.

Figure 4:
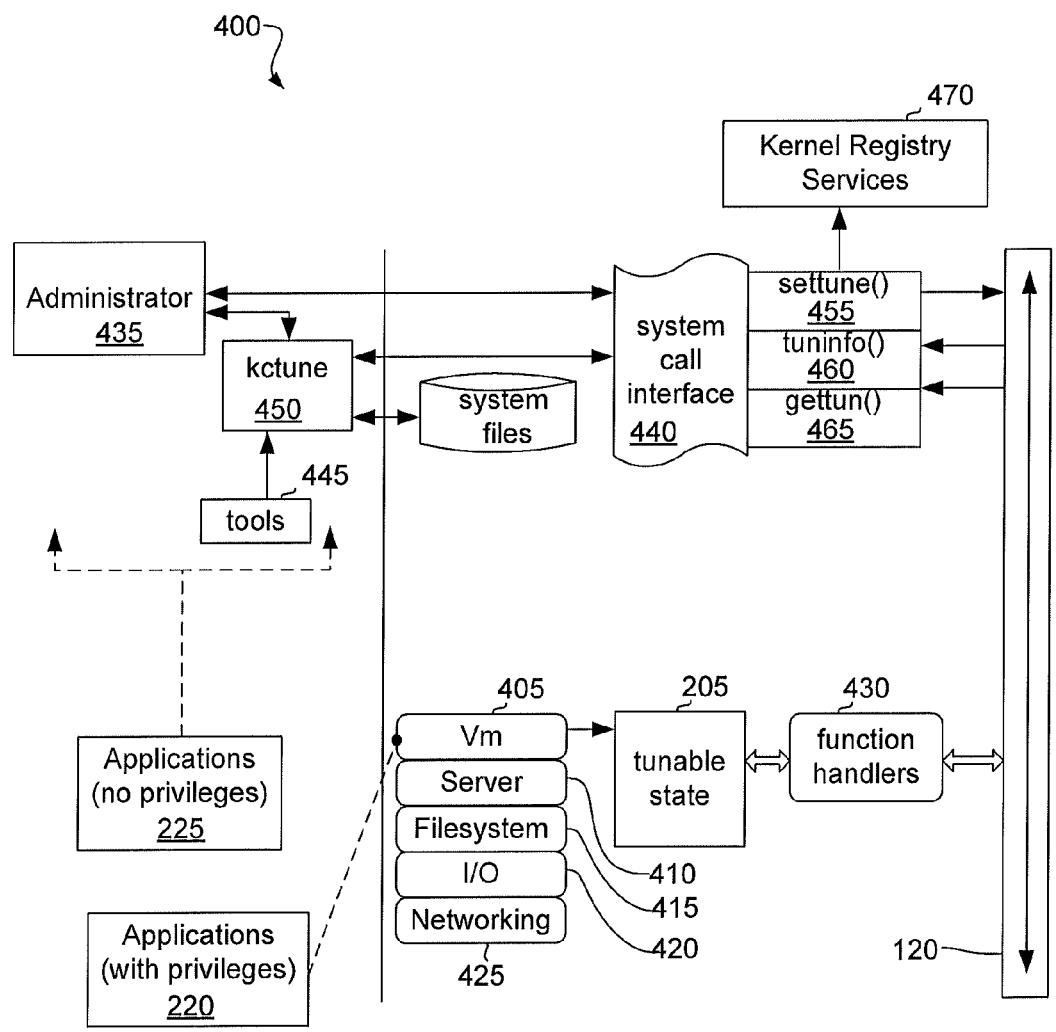
FIG. 4 is a diagram of an illustrative interface between computer-implemented applications and an operating system kernel according to one exemplary embodiment of the principles described herein.

Referring now to FIG. 4, a diagram of an illustrative interaction (400) between computer-implemented applications (220, 225, FIG. 2) and an operating system kernel (120, FIG. 1) is shown according to one exemplary embodiment of the principles described above.

As shown in FIG. 4, a kernel tunables (200, FIG. 2) may be configured in two ways: a) automatically and b) manually.

A tunable (200, FIG. 2) may be automatically configured in response to an application (220, FIG. 2) having sufficient privileges experiencing a demand for system resources that cannot be fulfilled under the current value of the tunable (200, FIG. 2). In the present example, the application (220, FIG. 2) may be running as a component of a virtual machine (405) implemented by a server (410) with a file system (415), a peripheral device interface (420), and networking components (425), consistent with the principles described in relation to FIG. 1. The application (220, FIG. 2) may be exposed to a tunable state (205, FIG. 2) of the tunable (200, FIG. 2) as described previously.

With adequate privileges, the application (220, FIG. 2) may be exposed to a tunable state (205, FIG. 2) that permits automatic configuration of the tunable value. Accordingly, the tunable state (205, FIG. 2) invokes a function handler (430) (i.e., a software algorithm within the kernel for automatically adjusting the tunable value) in response to the application (220, FIG. 2) exhibiting a demand for system resources that can be remedied by adjusting the tunable value.

Alternatively, if an application (225, FIG. 2) lacks sufficient privileges to invoke automatic tunable configuration, the tunable (200, FIG. 2) in question may only be adjusted manually by an administrator (435) accessing a system call interface (440) of the kernel tunable infrastructure (475) (i.e., a mechanism to manage tunables in kernel space) either directly or through software tools (445) of a kernel administration application (450). Various commands can be issued to the kernel tunable infrastructure (475) to manually configure the tunable (200, FIG. 2), including a set command (455) and query commands (460, 465). An updated tunable value will also be stored in a kernel registry services (470) data file (i.e. a kernel specific mechanism that facilitates the maintenance of structured data. This data can be either volatile, or persistent across operating system reboot)

Figure 5:
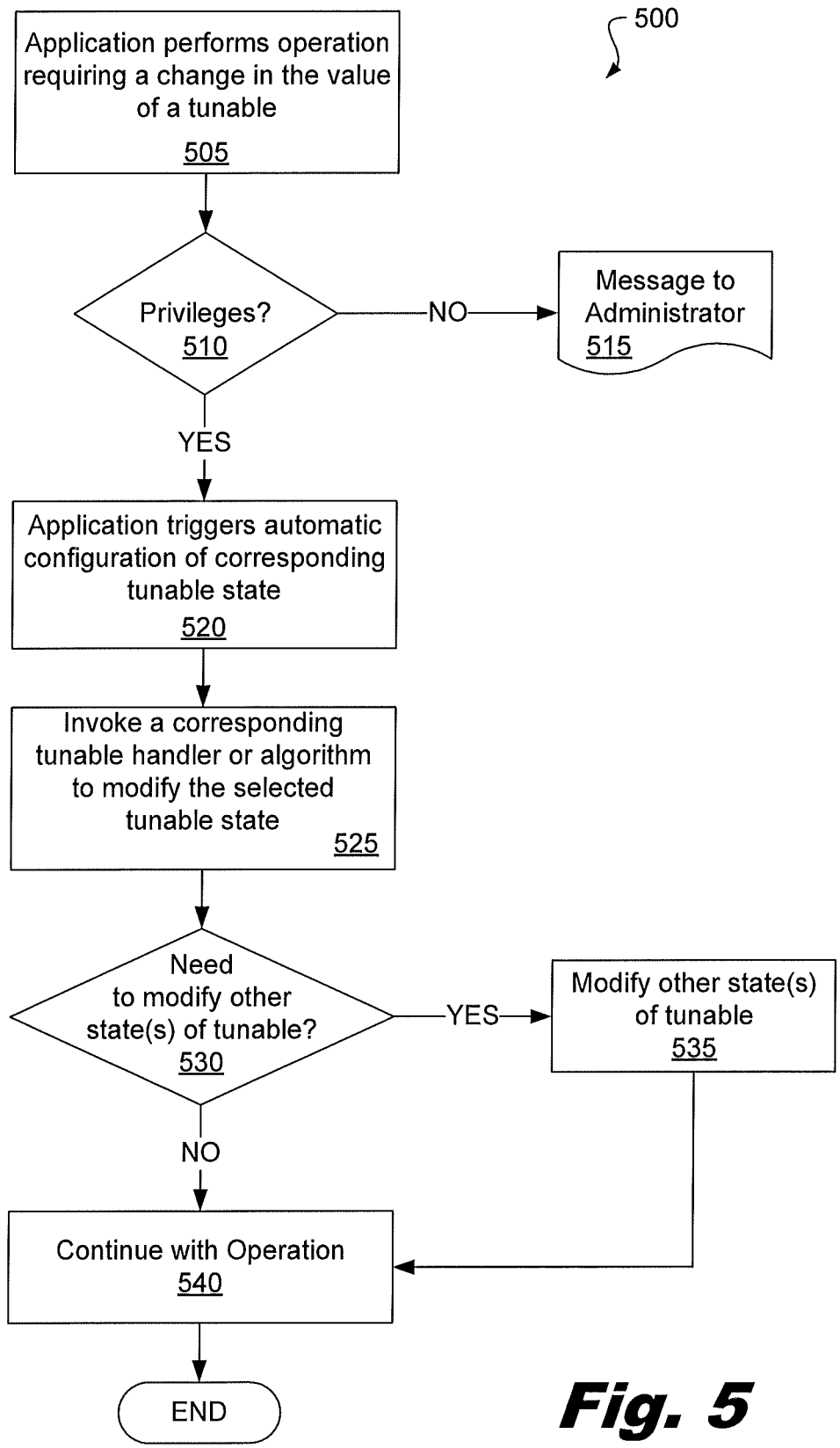
FIG. 5 is a flow diagram of an illustrative method of tuning an operating system kernel according to one exemplary embodiment of the principles described herein.

Referring now to FIG. 5, a flow chart is shown of an illustrative method (500) of automatically tuning an operating system kernel, consistent with the principles described herein. The method (500) commences when an application managed by the operating system performs (step 505) an operation requiring a change in the value of a kernel tunable.

The application in question will interface with a particular state of the tunable in accordance with the privileges granted to that application. If the application does not have sufficient privileges (decision 510, NO) to interact with an automatically tuning state of the tunable, a message (515) may be sent to an administrator informing the administrator of the application's demand for a change in the tunable value.

In the event that the application has sufficient privileges (decision 510, YES) to interact with an automatically tuning state of the tunable, the application may trigger (step 520) an automatic modification of the tunable state. As a result of this automatic modification process, a corresponding tunable handler or algorithm (430, FIG. 4) may be invoked (step 525) to modify the selected tunable state (205, FIG. 4) in a way that provides the application with access (220, FIG. 4) to the system resources it needs to complete its operation (step 505).

Because the modified tunable state may have siblings that are alternative states of the same core kernel tunable (200, FIG. 2), a determination may be made as to whether these alternative states should also be modified (decision 530) to maintain consistency among each of the alternative states of the core tunable (200, FIG. 2). If so, (decision 530, YES), the alternative states will be modified (step 535) as necessary. In any event, the application will be allowed to continue (step 540) executing its operation (step 505).

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A server, comprising:
a central processing unit;
electronic memory communicatively coupled to said central processing unit, said memory storing a dynamically tunable operating system kernel;
wherein said operating system kernel comprises at least one tunable implemented as a plurality of states, wherein each application managed by said operating system is assigned to one of said states according to a permission level associated with said application;
and wherein each said state defines a range of automated tuning of said tunable that is authorized to applications assigned to said state.

2. The server of claim 1, wherein said plurality of states comprises a fully automated tunable state configured to automatically modify a value of said tunable in response to an application performing an operation that cannot be completed without a change in said value of said tunable.

3. The server of claim 1, wherein said plurality of states comprises a partially automated tunable state configured to automatically modify a value of said tunable within a predefined absolute range in response to an application performing an operation that cannot be completed without a change in said value of said tunable within said range.

4. The server of claim 1, wherein said plurality of tunable states comprises a restricted tunable state configured to allow only manual modification of said tunable by an administrator.

5. The server of claim 1, wherein at least one of said states permits automated tuning of a first operating system kernel tunable while preventing automated tuning of a different, second operating system kernel tunable.

6. The server of claim 1, wherein at least one of said states permits automated tuning of a first operating system kernel tunable within a first range, while also permitting automated tuning of a second, different operating system kernel tunable within a second range, different from said first range.

7. The server of claim 1, wherein said plurality of states comprise at least three different states comprising a first state associated with full auto tuning privileges, a second state associated with limited auto tuning privileges and a third state associated with no auto tuning privileges.

8. The server of claim 1, wherein, in response to an allowed automated tuning of an operating system kernel tunable, said server determines whether to modify any of the plurality of states in response to the allowed automated tuning of an operating system kernel tunable.

9. The server of claim 2, wherein said fully automated tunable state is configured to prevent the modification of said value to a value beyond an absolute limit.

10. The server of claim 4, wherein said operating system kernel is configured to generate a notification to an administrator in response to an application performing an operation that cannot be completed without a change in a value of said tunable when said tunable state corresponding to said application does not permit said change in said value of said tunable.

11. A method, comprising:
evaluating in a server at least one permission level assigned to an application being executed by said server responsive to said application attempting to perform an operation requiring a change in a value of an operating system kernel tunable; and
automatically modifying said value of said kernel tunable to allow said application to perform said operation responsive to a determination that said at least one permission level authorizes said automatic modification.

12. The method of claim 11, wherein said determination comprises determining whether an implementation state of said tunable corresponding to said at least one permission level authorizes an automated modification of said tunable to a value required by said application to perform said operation.

13. The method of claim 11, wherein said modifying said value of said kernel tunable comprises modifying said value in at least one alternate implementation state of said kernel tunable.

14. The method of claim 11, further comprising preventing said application from performing said operation responsive to a determination that said at least one permission level does not authorize an automatic modification of said kernel tunable.

15. The method of claim 11, further comprising generating a notification to an administrator of said server responsive to a determination that said at least one permission level does not authorize an automatic modification of said value.

16. A computer program product comprising:
a non-transitory computer-readable medium having computer-readable executable code stored thereon, wherein said computer-readable executable code comprises:
computer-readable executable code configured to evaluate at least one permission level assigned to an application being executed by a server responsive to said application attempting to perform an operation requiring a change in a value of an operating system kernel tunable; and
computer-readable executable code configured to automatically modify said value of said kernel tunable to allow said application to perform said operation responsive to a determination that said at least one permission level authorizes said automatic modification.

17. The computer program product of claim 16, wherein said determination comprises determining whether an implementation state of said tunable corresponding to said at least one permission level authorizes an automated modification of said tunable to a value required by said application to perform said operation.

18. The computer program product of claim 16, wherein said modifying said value of said kernel tunable comprises modifying said value in at least one alternate implementation state of said kernel tunable.

19. The computer program product of claim 16, further comprising computer-readable executable code configured to generate a notification to an administrator of said server responsive to a determination that said at least one permission level does not authorize an automatic modification of said value.

20. The computer program product of claim 16, further comprising computer-readable executable code configured to prevent said application from performing said operation responsive to a determination that said at least one permission level does not authorize said automatic modification.

* * * * *

UNITED STATES PATENT AND TRADEMARK OFFICE
CERTIFICATE OF CORRECTION

PATENT NO.         : 8,650,396 B2
APPLICATION NO.    : 12/628673
DATED              : February 11, 2014
INVENTOR(S)        : Santosh Kumar Gangaraj Manoharan et al.

Page 1 of 1

It is certified that error appears in the above-identified patent and that said Letters Patent is hereby corrected as shown below:

In the Claims

In column 7, line 60, in Claim 1, before "electronic" insert -- at least one --.

In column 8, line 47, in Claim 11, delete "method," and insert -- method of tuning an operating system kernel, --, therefor.

Signed and Sealed this
Fifteenth Day of July, 2014

Michelle K. Lee
*Deputy Director of the United States Patent and Trademark Office*